United States Patent
Nakamura

(10) Patent No.: US 10,972,307 B2
(45) Date of Patent: Apr. 6, 2021

(54) COMMUNICATION SYSTEM

(71) Applicant: Yazaki Corporation, Tokyo (JP)

(72) Inventor: Yoshihide Nakamura, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/577,257

(22) Filed: Sep. 20, 2019

(65) Prior Publication Data

US 2020/0127868 A1    Apr. 23, 2020

(30) Foreign Application Priority Data

Oct. 18, 2018    (JP) .............................. JP2018-196433

(51) Int. Cl.
| | |
|---|---|
| *G06F 13/00* | (2006.01) |
| *H04L 12/403* | (2006.01) |
| *H04L 12/12* | (2006.01) |
| *H04L 12/40* | (2006.01) |

(52) U.S. Cl.
CPC ............ *H04L 12/403* (2013.01); *H04L 12/12* (2013.01); *H04L 12/40019* (2013.01); *H04L 2012/40273* (2013.01)

(58) Field of Classification Search
None
See application file for complete search history.

(56) References Cited

U.S. PATENT DOCUMENTS

| | | | | |
|---|---|---|---|---|
| 5,305,316 A | * | 4/1994 | Yoshida | .............. B60R 16/0315 340/310.11 |
| 9,794,753 B1 | * | 10/2017 | Stitt | .......................... G01S 5/02 |
| 2006/0047345 A1 | | 3/2006 | Kuwayama | |
| 2007/0073446 A1 | * | 3/2007 | Sequiera | .................... H02J 1/14 700/292 |
| 2007/0162671 A1 | * | 7/2007 | Seo | ...................... G06F 13/4282 710/110 |
| 2007/0262788 A1 | * | 11/2007 | Sanji | ........................ H04B 3/50 326/30 |

FOREIGN PATENT DOCUMENTS

| | | |
|---|---|---|
| JP | 2004343469 A | 12/2004 |
| JP | 2008310389 A | 12/2008 |
| JP | 2010-184575 A | 8/2010 |
| JP | 2012171361 A | 9/2012 |
| JP | 2018070132 A | 5/2018 |
| WO | 2004/039010 A1 | 5/2004 |

* cited by examiner

*Primary Examiner* — Henry Tsai
*Assistant Examiner* — Dean Phan
(74) *Attorney, Agent, or Firm* — Sughrue Mion, PLLC

(57) ABSTRACT

A communication system capable of shortening a setting time of an ID and reducing an incorrect setting is provided. A writing device sequentially transmits an ID of a plurality of slave devices after transmitting of the ID of a master device. The master device includes a plurality of semiconductor relays provided for each of the plurality of master slave devices for supplying power to the corresponding slave devices. The master device receives the ID of the master device from the writing device, and sets it as its own ID. The master device, every time the ID of the plurality of slave devices is received from the writing device after setting the ID of its own, turns on the semiconductor relays in order. The plurality of slave devices sets the ID received after power supply as its own ID.

13 Claims, 6 Drawing Sheets

COMMUNICATION SYSTEM

BACKGROUND OF THE INVENTION

Field of the Invention

The present invention relates to a communication system.

Description of the Related Art

A vehicle such as a passenger car and a freight car is equipped with various loads such as a lamp and a power window. Then, there has been proposed a technology for controlling the loads using communication with a slave device to which a plurality of loads is connected and a master device controlling the plurality of slave devices.

In the above technology, the plurality of slave devices to which the plurality of loads is respectively connected needs to be set an ID.

As a method of setting the above-mentioned ID, for example, the one described in Patent Literature 1 has been proposed. In the ID setting method described above, each time a slave device whose ID is not set is connected to the in-vehicle LAN, the master device sends an ID to the slave device, and the slave device stores the ID.

However, there was a problem that setting the ID for each connection of the slave device requires a long time for the ID setting. There was also the problem that since the order of ID to be sent by the master device to the slave device is fixed, the ID different from the original is set if the connection order to the in-vehicle LAN of the slave device is different.

CITATION LIST

Patent Literature 1: JP-A-2010-184575

SUMMARY OF THE INVENTION

The present invention has been made in view of the above background, and it is an object of the present invention to provide a communication system capable of shortening an ID setting time and reducing an erroneous setting.

A communication system according to an aspect of the present invention includes a plurality of slave devices; a master device communicating with the plurality of slave devices; a writing device for writing an ID into the slave device and the master device; the writing device transmits the ID of the master device, and then sequentially transmits the ID of the plurality of slave devices, the master device is provided with a plurality of output switches provided for each of the plurality of slave devices for supplying power to the corresponding slave device, a first setting unit for receiving from the writing device and setting as its own ID the ID of the master device, and a switch control unit, after setting of its own ID, switching on the output switch in sequence each time the IDs of the plurality of slave devices are received from the writing device, and the plurality of slave devices includes a second setting unit setting the ID received after power supply as its own ID.

Further, preferably, the master device is installed in a vehicle, and the plurality of slave devices is connected to a plurality of loads, and wherein provided that the plurality of loads is classified into a load that can be driven at all times, a load that can be driven during driving an accessory, and a load that can be driven upon ignition, a same type of the load is connected to one slave device.

Further, preferably, the master device is installed plurally in a vehicle, the ID of the master device includes installation information indicating installation position of the master device in the vehicle.

In addition, preferably, it comprises a plurality of types of circuit blocks, each with different functions and formed on separate substrates, and the slave device and the master device are configured combining the plurality of types of circuit blocks.

Further, preferably, the circuit block includes a control block for controlling the slave device or the master device, an input block connected to an input port of the control block for inputting an input signal to input port, and an output block connected to an output port and including an output switch turning on and off responding to the output signal.

According to the aspect described above, since there is no need to allocate an ID each time the slave device is connected, the setting time of the ID can be shortened and erroneous setting can be reduced.

DETAILED DESCRIPTION OF THE PREFERRED EMBODIMENTS

Figure 1:
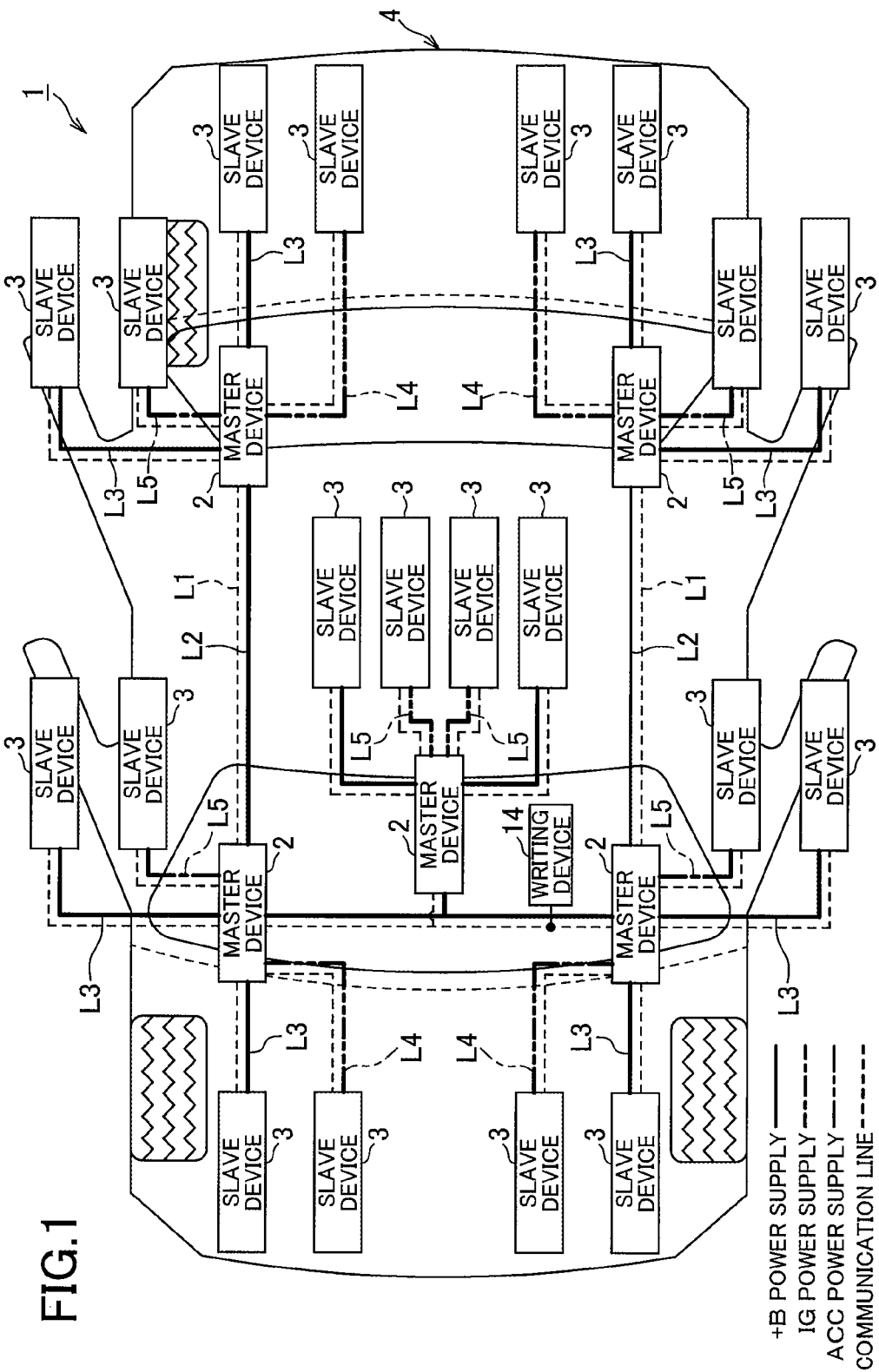
FIG. 1 is a block diagram showing an in-vehicle network as a communication system of the present invention.
Figure 2:
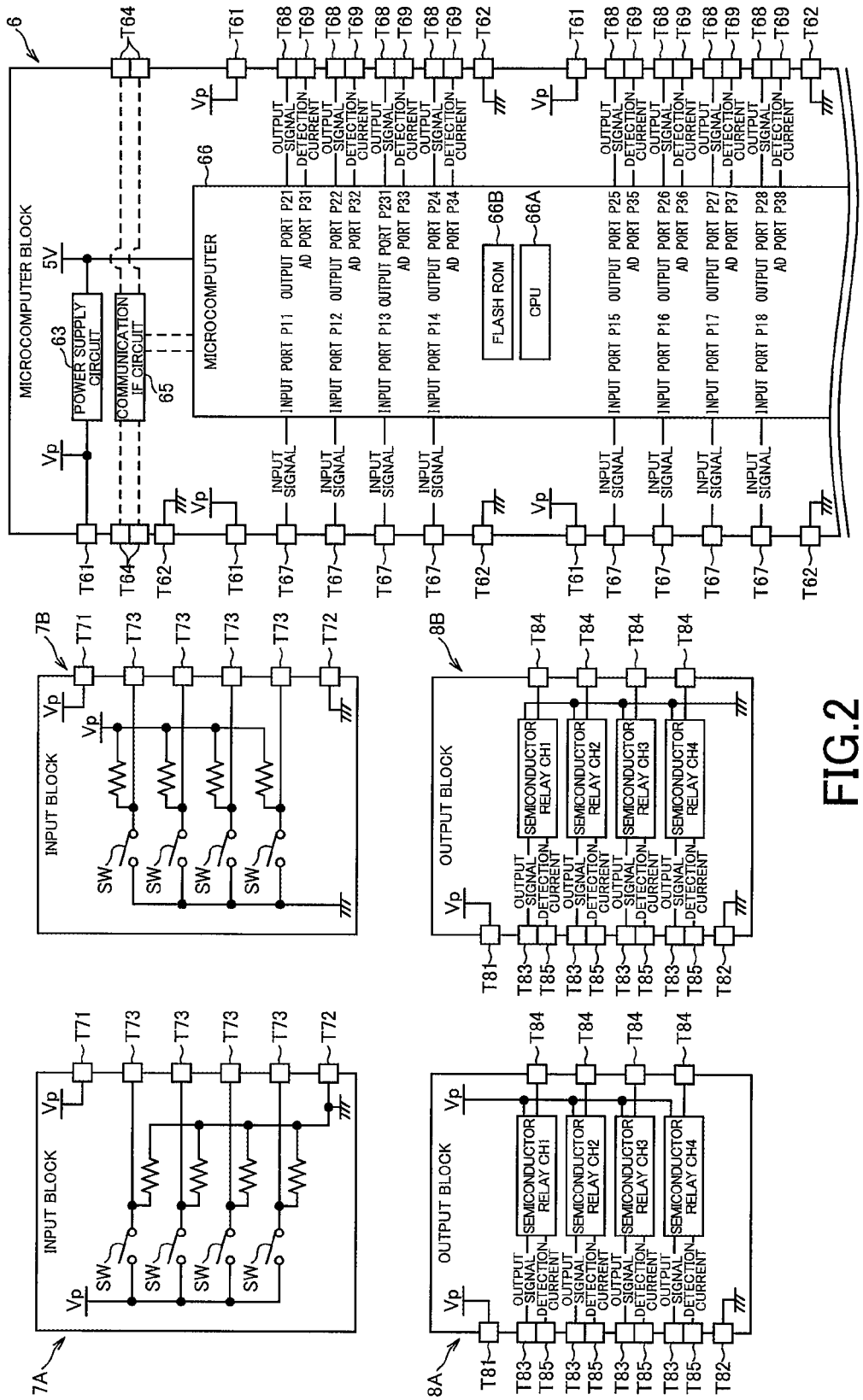
FIG. 2 is a block diagram showing a master device and a slave device that make up the in-vehicle network shown in FIG. 1.
Figure 3:
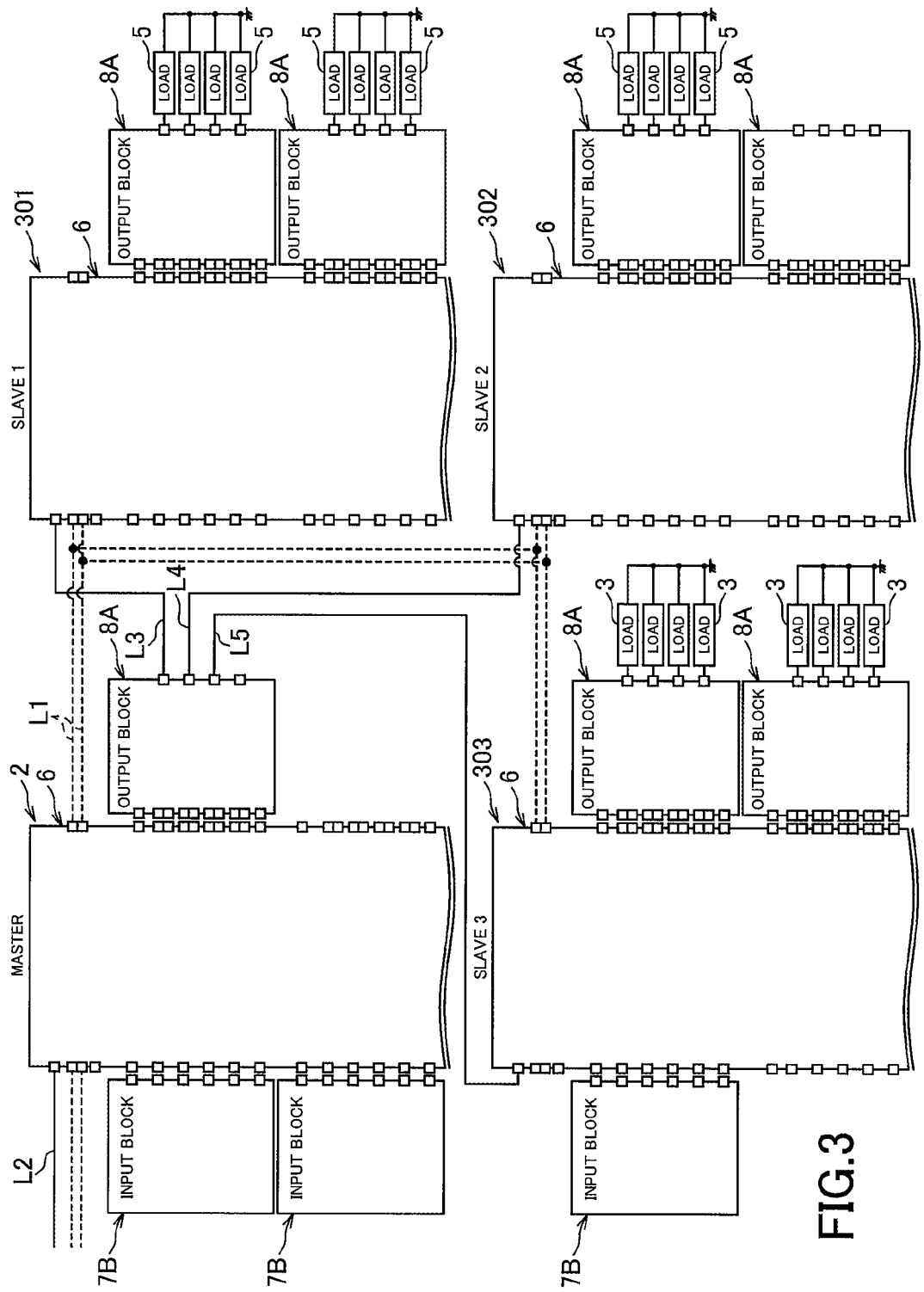
FIG. 3 is a block diagram showing the in-vehicle network shown in FIG. 1 configured combining the blocks shown in FIG. 2.

Hereinafter, an embodiment of the present invention will be described based on FIGS. 1 and 2. FIG. 1 is a block diagram showing an in-vehicle network as a communication system of the present invention. FIG. 2 is a block diagram showing a master device 2 and a slave device 3 that make up the in-vehicle network 1 shown in FIG. 1. FIG. 3 is a block diagram showing the in-vehicle network shown in FIG. 1 configured to combine the blocks shown in FIG. 2.

An in-vehicle network 1 shown in FIG. 1 is mounted on a vehicle 4. The in-vehicle network 1 includes a plurality of master devices 2 and a plurality of slave devices 3 (which may be described as slave devices 301-301 as shown in FIG. 3). The plurality of master devices 2 is arranged in each area in a vehicle 4. In the present embodiment, the master device 2 is respectively arranged on front right side (FR-RH), front left side (FR-LH), front center (FR-CENTER), rear right side (RR-RH), and rear left side (RR-LH) in five places in the vehicle 4.

The five master devices 2 are communicably connected to each other by a communication line L1. The master device 2 is connected to each other by +B power supply line L2 connected to a battery (not shown), and is supplied power via +B power supply line L2.

In addition, each of five master devices 2 is communicably connected to the plurality of slave devices 3 arranged in its own area via the communication line L1. The master device 2 and the slave device 3 are connected by one to multiple. The master device 2 communicates with the plurality of slave devices 3, and thereby controls the plurality of slave devices 3. The slave device 3 is connected to multiple loads 5 (FIG. 3) such as a lamp, a seat motor and a door motor placed in its own area and controls driving of the load 5 according to communication with the master device 2.

The slave devices 3 in each area are provided separately for +B to be connected to the load 5 that can always be driven, for an ACC to be connected to load 5 that can be driven at driving accessory, and for an IG to be connected to the load 5 that can be driven during ignition.

In the present embodiment, each of the master device 2 and the slave device 3 described above is configured by combining a block 6, input blocks 7A and 7B, and output blocks 8A and 8B as shown in FIG. 2. Each block 6-8A, 8B is provided on a separate substrate, and these are combined to constitute the master device 2 and the slave device 3 of various types of in-vehicle network 1.

The control block 6 is a block that controls overall the master device 2 and the slave device 3. The substrate of the control block 6 includes a power supply terminal T61, a ground terminal T62, a power supply circuit 63, a communication terminal T64, a communication IF circuit 65, a microcomputer 66, a plurality of input terminals T67, a plurality of output terminals T68, and a plurality of input terminals T69. The power supply terminal T61 and the ground terminal T62 are the terminals to be connected to power supply and ground, respectively.

The power supply circuit 63 converts the power supply Vp connected to the power supply terminal T61 to a predetermined voltage (5V power supply in the present embodiment). The communication IF circuit 65 is an interface circuit that enables input and output of signals corresponding to various types of communications (in this embodiment, CAN and LIN) from the communication terminal T64.

The microcomputer 66 includes input ports P11 to P18, output ports P21 to P28, AD ports P31 to P38, PWM output not shown, a timer, a communication function, a RAM, a CPU (Central Processing Unit) 66A, a flash ROM (Read Only Memory) 66B, etc.

Figure 4:
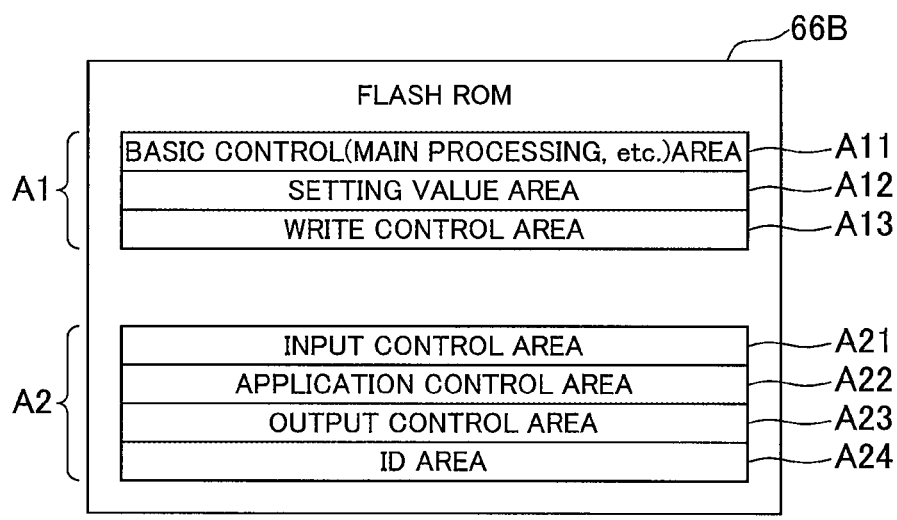
FIG. 4 is a diagram showing a configuration of a flash ROM of the slave device shown in FIG. 2.

The CPU 66A controls the entire of the master device 2 and the slave device 3 and performs various processes according to the processing program. In the flash ROM 66B, as shown in FIG. 4, a non-write target area A1 not to be written by the writing device 14 described later and a write target area A2 to be written by the write device 14 are formed.

In the non-write target area A1, a basic control area A11, a setting value area A12, and a writing control area A1 are formed. The basic control area A11 stores communication settings and basic operation program. The setting value area A12 stores various set values. The write control area A13 stores a program for writing into the write target area A2 described later.

The writing target area A2 includes an input control area A21, an application control area A22, an output control area A23, and an ID area A24. The input control area A21 stores a program that determines input based on the input signals from the input ports P11 to P18. The application control area A22 stores a program that communicates an input judgment result as an input judgment data and a program that determines a load operation based on the input judgment data received through the communication. The output control area A23 stores a program that outputs an output signal based on the load operation judgment result from the output ports P21 to P28. The ID area A24 stores the ID necessary for communication.

Further, the plurality of input terminals T67 shown in FIG. 2, which is provided in eight or more in the present embodiment, are connected to the input ports P11 to P18 (ninth and higher input ports are not shown) of the microcomputer 66. In the embodiment, eight or more output terminals T68 are provided, and are connected to the output ports P21 to P28 (ninth and higher output ports are not shown) of the microcomputer 66. In the present embodiment, eight or more input terminals T69 are provided, and are connected to the AD port P31 to P38 (the ninth and higher AD ports are not shown) of the microcomputer 66.

The input blocks 7A, 7B are connected to the input ports P11 to P18 of the control block 6, which is for inputting an input signal to the input ports P11 to P18. The input blocks 7A and 7B substrates include a power supply terminal T71, a ground terminal T72, a plurality of local switches SW, and a plurality of output terminals T73 formed thereon. The power supply terminal T71, and the ground terminal T72 are terminals connected to the power supply and the ground, respectively. The plurality of local switches SW is for the user to operate the load 5. In the present embodiment, the local switches SW are provided four, which are smaller than the number of input terminals T67 of the control block 6.

The output terminal T73 is a terminal for outputting on/off state of the local switch SW, and is provided in the same number as the local switches SW. In the present embodiment, as the input blocks 7A, 7B, the block 17A where Lo (ground) is output and block 7B where Hi (power supply) is output from the output terminal T73 when the local switch SW is turned on are illustrated. Not limited to this, the output terminal T73 where Hi is output, and the output terminal T73 where Lo is output may be mixed.

The output blocks 8A, 8B are connected to the output ports P21 to P28 of the control block 6, and the semiconductor relays CH1 to CH4 (output switches) that are turned on and off in response to the output signal are formed. The substrates of the output blocks 8A and 8B include a power supply terminal T81, a ground terminal T82, a plurality of semiconductor relays CH1 to CH4, a plurality of input terminals T83, and a plurality of output terminals T84, and T85. The power supply terminal T81 and the ground terminal T82 are connected to the power supply and the ground, respectively. The plurality of semiconductor relays CH1 to CH4 is, for example, constituted by IPD capable of detecting current. Note that the plurality of semiconductor relays CH1 to CH4 are not limited to this, but may be composed of mechanical relays or general-purpose MOSFETs, shunt resistors, or sense MOSFETs.

The plurality of input terminals T83 is provided in a one-to-one relationship with the semiconductor relays CH1 to CH4, to which an output signal from microcomputer 66 is input. The semiconductor relays CH1 to CH4 turn on and off according to the output signal inputted. The plurality of output terminals T84 is provided on a one-to-one basis to the semiconductor relays CH1 to CH4, and power supply or ground is output when the corresponding semiconductor relays CH1 to CH4 are turned on. The output terminal T85 is provided on a one-to-one basis to the semiconductor relays CH1 to CH4, from which the current flowing to the semiconductor relays CH1 to CH4 is output as the detection current.

In the present embodiment, as the output blocks 8A and 8B, two types are illustrated as a block 8A where the power is output and a block 8B where ground is output from the output terminal T84 when the semiconductor relays CH1 to CH4 are turned on.

FIG. 3 is a block diagram showing an example of the in-vehicle network 1 configured by combining the blocks described above. As shown in the figure, the master device 2 has a control block 6 and two of an input block 7B and an output block 8A.

The semiconductor relays CH1 to CH3 constituting the master device 2 are connected to the slave devices 301 to 303 for +B, for ACC, and for IG via the +B power supply line L3, the power source line L4 and IG power supply line L5, respectively. The slave device 3 is not connected to the semiconductor relay CH4. The semiconductor relays CH1 to CH3 are turned on in response to the output signal from microcomputer 66, and supply the power from the +B power source line L2 to the corresponding slave devices 301 to 303 via the +B power source line L3, the ACC power line L4, and the IG power line L5.

Also, the slave device 301 for +B includes the control block 6, and two output blocks 8A. The slave device 302 for ACC has the control block 6, the input block 7A and two output blocks 8A. The slave device 303 for IG is composed of the control block 6 and two output blocks 8A.

The semiconductor relays CH1 to CH4 constituting these slave devices 301 to 303 are connected to the load 5, and turns on in response to the output signal from the control block 6 to supply power to the load 5.

Next, a bit assignment (allocation) of the signal transferred between the master device 2 and the slave devices 301 to 303 is described with reference to Table 1 below.

the installation position in the left and right direction of the vehicle 4, which becomes "01" if the installation position of the slave device 3 corresponds to the right side, "10" the left side, and "11" the center in the left-right direction of the vehicle 4.

The classification information is allocated Bit 6, which becomes "0" in the case of the slave device 3, and "1" the master device 2.

The transmission and reception information are allocated Bit 5, which becomes "1" if the slave device 3 transmits to the master devices 2, "0" if the slave device 3 receives from the master device 2.

The slave information is allocated Bit 4 to bit 0. The slave information is allocated to the plurality of slave devices 301 to 303 connected to the master device 2 without duplication (it may overlap between the slave devices 301 to 303 connected to the different master devices 2). Note that in the present embodiment, the slave information is represented by 2 bits, but the number of bits is increased according to the number of slave devices 3 to be connected to the master device 2.

A BYTE 1 of bit 7 to bit 0 following the ID represents an input determination data after setting of the ID. Each of the bit 7 to bit 0 is allocated to a plurality of output ports P21 to P24. Then, if each bit n (n is an arbitrary integer from 0 to 7) is "0", it indicates that the semiconductor relays CH1 to CH 7 connected to the output ports P2(n+1) allocated to the bit n is off. If each bit n is "1", it indicates that the semiconductor relays CH1 to CH 4 connected to the output port P2 (n+1) allocated to the bit n is on.

TABLE 1

| ID | | | | | | | | | | |
|---|---|---|---|---|---|---|---|---|---|---|
| INSTALLATION INFORMATION | | | | TYPE | TRANSMISSION/ RECEPTION INFORMATION | SLAVE INFORMATION | | | | |
| bit10 | bit9 | bit8 | bit7 | bit6 | bit5 | bit4 | bit3 | bit2 | bit1 | bit0 |
| FRONT: 01 REAR: 10 CENTER: 11 | | RIGHT: 01 LEFT: 10 CENTER: 11 | | SLAVE: 0 MASTER: 1 | RECEPTION: 0 TRANSMISSION: 1 | SLAVE 1: 0001 SLAVE 2: 0002 . . . SLAVE n: XXXX | | | | |

| BYTE1 INPUT DETERMINATION DATA | | | | | | | |
|---|---|---|---|---|---|---|---|
| bit7 | bit6 | bit5 | bit4 | bit3 | bit2 | bit1 | bit0 |
| OUTPUT PORT P28 ON: 1 OFF: 0 | OUTPUT PORT P27 ON: 1 OFF: 0 | OUTPUT PORT P26 ON: 1 OFF: 0 | OUTPUT PORT P25 ON: 1 OFF: 0 | OUTPUT PORT P24 ON: 1 OFF: 0 | OUTPUT PORT P23 ON: 1 OFF: 0 | OUTPUT PORT P22 ON: 1 OFF: 0 | OUTPUT PORT P21 ON: 1 OFF: 0 |

As shown in Table 1 above, the first bit 10 to bit 0 represent IDs of the slave devices 3 and the slave device 2. The IDs are information allocated without duplication to all slave devices 3 disposed in the vehicle 4. The ID is constituted by installation information, classification information, transmission and reception information, and slave information.

Figure 5:
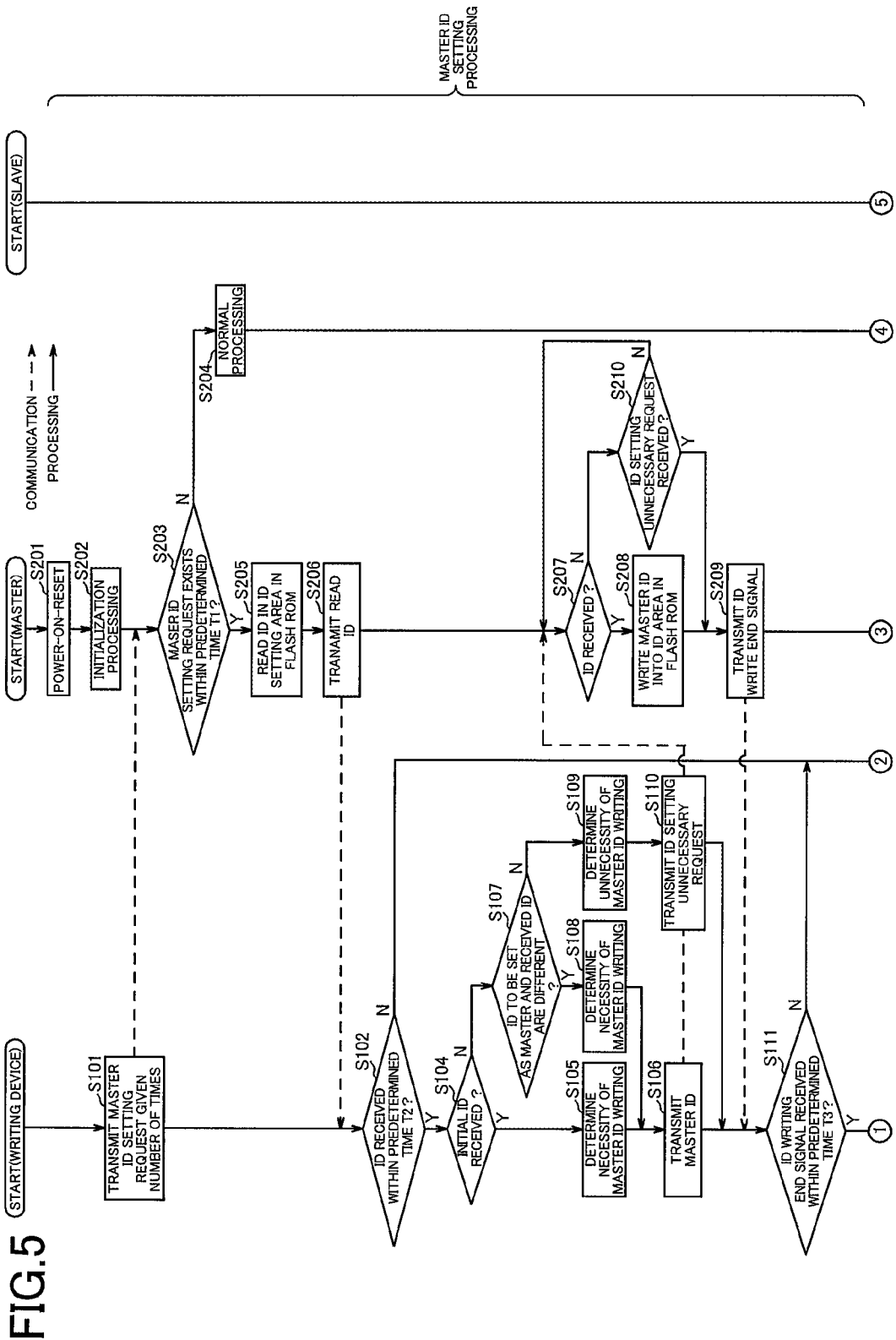
FIG. 5 is a flowchart showing an operation processing procedure of the master device and the slave device shown in FIG. 1.
Figure 6:
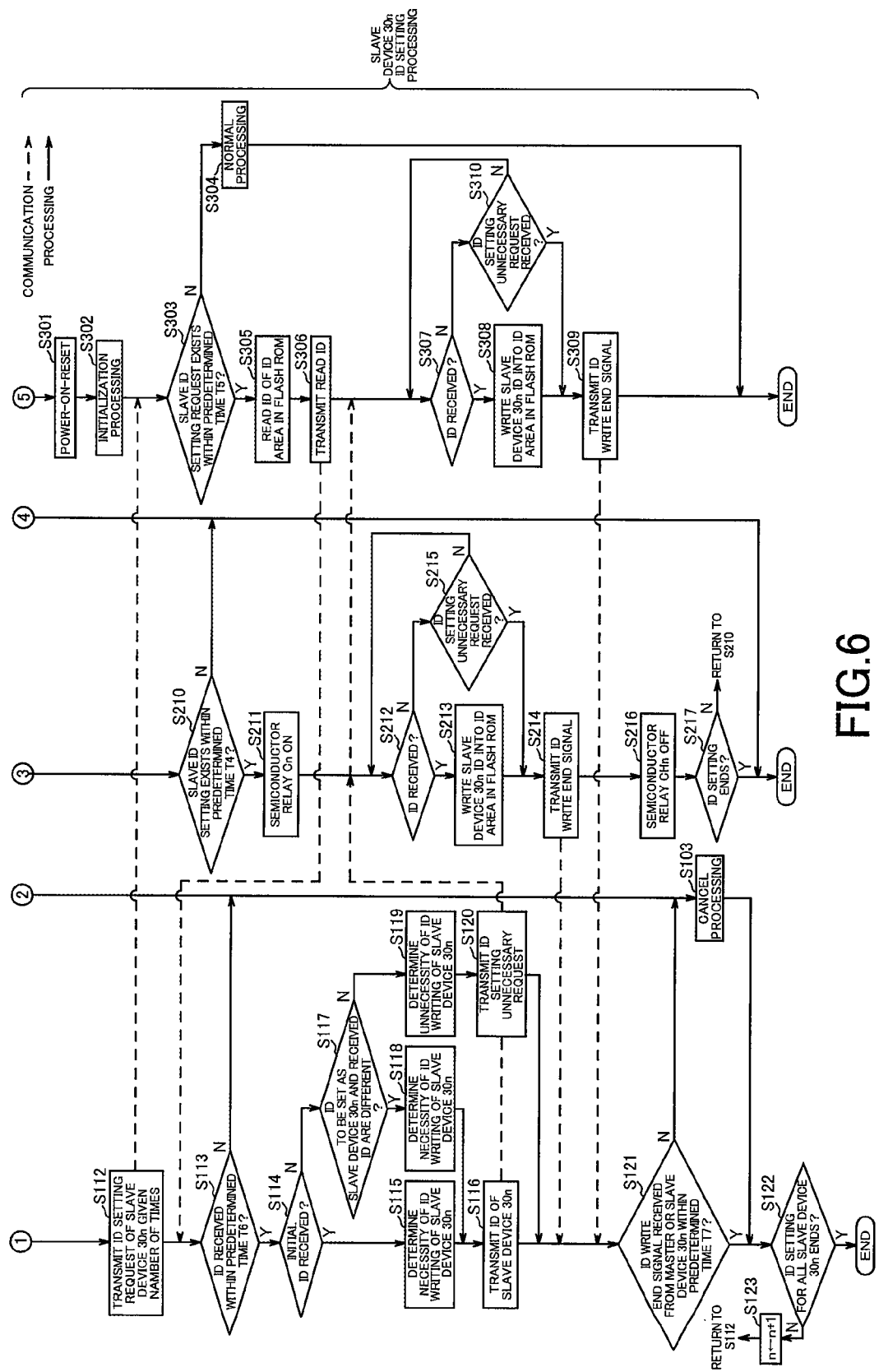
FIG. 6 is a flowchart showing an operation processing procedure of the master device and the slave device shown in FIG. 1.

Bit 10 to bit 7 are allocated to the installation information. The bit 10 to bit 9 indicate an installation position in a traveling direction of the vehicle 4, which becomes "01" if the installation position of the slave device 3 corresponds to the front side, "10" the rear side, and "11" the center of the traveling direction of the vehicle 4. The bit 8 to bit 7 indicate Next, the ID setting operation of the in-vehicle network 1 configured as described above will be described with reference to the flowcharts of FIGS. 5 and 6. In the initial state (when ID is not set), the all control blocks 6 are set the same initial ID (an initial reception ID, an initial transmission ID). The writing device 14 is set the ID of the master device 2 and the ID of the slave device 3 in each area.

First, the user connects the writing device 14 (FIG. 1) to the communication line L1. The writing device 14 is set the order of the area where the ID is to be set. For example, in the example shown in FIG. 1, the order is set in the order of connection to the communication line L1 in the order of FR-RH→RR-RH→RR-LH→FR-LH→FR-CENTER or FR-CENTER→FR-LH→RR-LH→RR-RH→FR-RH.

After activated, the writing device 14 executes an ID setting process of the FR-RH area. In the ID setting process the writing device 14 transmits a master ID setting request a predetermined number of times (step S101).

Also, the master device 2 is activated in the order of the areas in which the IDs are to be set. At first, the master device 2 in the area of FR-RH is activated. After startup, the CPU 66A of the master device 2 (hereinafter may be referred to as the master device 2) executes power reset and initialization processing first (steps S201 and S202).

Thereafter, the master device 2 determines whether to receive the master ID setting request within the predetermined time T1 (step S203). If the master ID setting request has not been received (N in step S203), the master device 2 executes the normal processing (step S204), and ends the processing.

On the other hand, the master device 2, when receiving the master ID setting request (Y in step S203), reads the ID stored in the ID area A24 of the flash ROM 66B (step S205). The read ID will be the initial ID if the ID of the master device 2 is not set. Thereafter, the master device 2 transmits the read ID (step S206).

After transmitting the master ID setting request (step S101), the writing device 14 determines whether or not the ID has been received within the predetermined time T2 (step S102). If not receiving the ID (N in step S102), the writing device 14 cancels the process (step S103 in FIG. 6).

On the other hand, when the ID is received (Y in step S102), the writing device 14 determines whether the received ID is an initial ID (step S104). If it is the initial ID (Y in step S104), the writing device 14 determines that writing to the master device 2 is necessary, and executes the transmission setting of the ID (step S105), before the process proceeds to step S106. For example, the IDs of the master device 2 in the FR-RH area are as shown in Table 2 below.

device 14 determines that the ID writing to the device 2 is unnecessary, and executes the transmission setting of the ID setting unnecessary request (step S109). Thereafter, the writing device 14 transmits an ID setting unnecessary request (step S 110).

On the other hand, the master device 2 determines whether or not the ID has been received (step S207) from the writing device 14 after the ID transmission (step S206). When the ID is received (Y in step S207), the master device 2 writes the received ID in the ID area A24 of the flash ROM 66B (step S208), and then the process proceeds to step S209. Also, the master device 2, after the ID transmission (step S206), when an ID setting unnecessary request is received from the writing device 14 (Y in step S210), proceeds to step S209.

In step S209 the master device 2 transmits an ID write end signal. The writing device 14 transmits the master ID and ID setting unnecessary request (steps S106 and S110), and then if the ID writing end signal cannot be received within the predetermined time T3 (N in step S111), immediately stop the processing (step S103 in FIG. 6). On the other hand, the writing device 14, when receiving the ID write end signal at a predetermined time T3 (Y in step S111), transmits a predetermined number of times the ID setting request of the slave device 30n (n is an arbitrary integer and "1" in an initial state) connected to the output port P1n of the slave device 2 (step S112 in FIG. 6).

On the other hand, after transmitting the ID write end signal (step S209), the master device 2, if receiving the ID setting request of slave device 30n within time T4 (step S210), performs a predetermined operation, turns on the semiconductor relay CHn connected to the slave device 30n specified in the ID setting request (Step S211). As a result, power is supplied to the slave device 30n, which is then activated. The CPU 66A of slave device 30n (hereinafter it may be referred to simply as slave device 30n), after power on, executes power-on-reset and initialization processing (steps S301, S302).

TABLE 2

| ID (CAN: 11 bit) | | | | | | | | | | |
|---|---|---|---|---|---|---|---|---|---|---|
| INSTALLATION INFORMATION | | | | TYPE | TRANSMISSION/ RECEPTION INFORMATION | SLAVE INFORMATION | | | | |
| bit10 | bit9 | bit8 | bit7 | bit6 | bit5 | bit4 | bit3 | bit2 | bit1 | bit0 |
| MASTER ID TRANSMISSION ID (0x170) | | | | | | | | | | |
| 0 | 1 | 0 | 1 | 1 | 1 | 0 | 0 | 0 | 0 | 0 |
| RECEPTION ID (0x160) | | | | | | | | | | |
| 0 | 1 | 0 | 1 | 1 | 0 | 0 | 0 | 0 | 0 | 0 |

On the other hand, if the ID is not the initial ID (N in step S104), the writing device 14 determines whether the ID to be set as the master device 2 in the area to be set and the reception ID are different (Step S107). If determining that they are different (Y in step S107), the writing device 14 determines that the ID writing to the master device 2 is necessary, and executes the transmission setting of the ID, and after that (step S108), the process proceeds to step S106. In step S106, the writing device 14 transmits the ID set for transmission in steps S105, S108.

On the other hand, when determining that the ID to be set as the master device 2 of the area intended to be set and the reception ID are the same (N in step S107), the writing Thereafter, the slave device 30n determines whether or not to receive the ID setting request within a predetermined time T5 (step S303). The slave device 30n, if not receiving the ID setting request (N in step S303), ends the process after executing the normal process (step S304).

On the other hand, when receiving the ID setting request (Y in step S303), the slave device 30n reads the ID stored in the ID area A24 of the flash ROM 66B (step S305). Thereafter, the slave device 30n transmits the read ID (step S306).

After transmitting the ID setting request (step S112), the writing device 14, if not receiving the ID within a predetermined time T6 (N in step S113), immediately stops the processing (step S103). On the other hand, when receiving the ID (Y in step S113), the writing device 14 determines whether the received ID is an initial ID (step S114).

If the received ID is the initial ID (Y in step S114), the writing device 14, determines that the writing of data to the slave device 30n is necessary and sets to transmit the ID (step S115), and goes to step S116. For example, the ID of the slave device 301 connected to the output port P11 of the master device 2 in the FR-RF area is as shown in Table 3 below.

TABLE 3

| ID (CAN: 11 bit) | | | | | | | | | | |
|---|---|---|---|---|---|---|---|---|---|---|
| INSTALLATION INFORMATION | | | | TYPE | TRANSMISSION/ RECEPTION INFORMATION | SLAVE INFORMATION | | | | |
| bit10 | bit9 | bit8 | bit7 | bit6 | bit5 | bit4 | bit3 | bit2 | bit1 | bit0 |
| | | | | | SLAVE ID TRANSMISSION | | | | | |
| 0 | 1 | 0 | 1 | 0 | 1 | 0 | 0 | 0 | 0 | 1 |
| | | | | | RECEPTION | | | | | |
| 0 | 1 | 0 | 1 | 0 | 0 | 0 | 0 | 0 | 0 | 1 |

On the other hand, if it is not the initial ID (N in step S114), the writing device 14 determines whether or not the ID to be set as the slave device 30n and the received ID are different (step S117). When determining that they are different (Y in step S117), the writing device 14 determines that the ID writing for the slave device 30n is necessary and sets to transmit the ID (S118), then proceeds to step S116. In step S116, the writing device 14 transmits the ID set for transmission in steps S115 and S118.

On the other hand, determining that ID to be set as slave device 30n and the received ID are the same (N in step S117), writing device 14 determines that the ID writing to the slave device 30n is unnecessary, and sets transmission of the ID setting unnecessary request (step S119). Thereafter, the writing device 14 transmits the ID setting unnecessary request (step S120).

On the other hand, after turning on the semiconductor relay CHn (step S221), the master device 2 determines whether the ID has been received from the device 14 (step S212). If receiving the ID (Y in step S212), the master device 2 writes the received ID in the ID area A24 of the flash ROM 66B as the ID of the slave device 30n (step S213) and goes to the next step 214.

On the other hand, when receiving the ID setting unnecessary request (Y in step S215), the master device 2 directly then proceeds to step S214. In step S214, the master device 2, after transmitting an ID write end signal, turns off the semiconductor relay CHn (step S216). After that, the master device 2 determines whether or not the ID setting for all slave devices 3 that require the ID setting ends (step S217).

If the ID setting has been completed (Y in step S217), the master device 2 immediately ends processing. On the other hand, if the ID setting has not been completed (N in step S217), the master device 2 returns to step S210.

On the other hand, after the ID transmission (step S306), the slave device 30n determines whether the ID has been received from the wiring device 14 (step S307). If the ID can be received (Y in step S307), the slave device 30n, after writing the received ID in the ID area A24 of M66B of the flash ROM (step S308) as its own ID, goes to next step S309.

On the other hand, when receiving the ID setting unnecessary request (Y in step S310), the slave device 30n immediately proceeds to step S309. In step S309 the slave device 30n, after transmitting the ID write end signal, ends the process.

The writing device 14 transmits the ID of the slave device 30n (step S116), and then determines whether or not the ID write end signal is received from the master device 2 and the slave device 30n within the predetermined time T7 (step S121).

When determining that the ID write end signal has been received (Y in step S121), the writing device 14 determines whether or not the ID setting for all slave devices 3 has been completed (step S122). If determining that the process has not ended (N in step S122), the writing device 14 returns to step S112 after incrementing n (step S123).

On the other hand, when determining that the writing device 14 has ended (Y in step S122), the writing device 14 immediately ends the process.

The writing device 14 executes the above-described steps S101 to S113 corresponding to the FR-RH area, and then sequentially executes the above-described steps S101 to S113 corresponding to the next area. In response to this, the user activates the slave device 3 corresponding to the area. Thus the ID can be set to the master device 2 and the slave device 3.

According to the embodiment described above, the master device 2 receives from the writing device 14 and sets as its own ID the ID of the master device 2. Also, the master device 2, each time when the IDs of the plurality of slave devices 3 is received from the writing device 14, sequentially turns on the semiconductor relay CH1 to CH4. The plurality of slave devices 3 sets the ID received after power supply as their own IDs. In this way, since it is not necessary to assigns the ID each time the slave device 3 is connected (assembled), it is possible to reduce the setting time of the ID and to reduce the erroneous setting.

Further, according to the embodiment described above, the master device 2 is installed in the vehicle 4 and the plurality of master devices 3 is connected to the plurality of loads 5. The plurality of loads 5 is classified to a load 5 that can be driven at any time, a load 5 that can be driven during power on of accessory, and a load 5 that can be driven during ignition. The same type of load 5 is connected to one slave device 3. Thereby, power is supplied to the slave device 3, and the ID can be set using the semiconductor relays CH1 to CH4 for enabling the load 5 to be driven.

According to the embodiment described above, the plurality of master devices 2 is installed in the vehicle 4 and the ID stored in the flash ROM 24B includes the installation information indicating the installation position of the master device 2 in the vehicle 4. As a result, different IDs can easily be assigned to the slave devices 3 set in the vehicle 4.

According to the embodiment described above, since the master device 2 and the plurality of slave devices 3 are configured combining the plurality of types of blocks 6 to 8A and 8B, when function change and design change occur, the blocks 6-8A, 8B can be replaced or added in block units, thereby reducing cost.

According to the embodiment described above, the block includes the control block 6 which controls the slave device 3 or the master device 2, the input blocks 7A and 7B connected to the input ports P11 to P18 of the control block 6 for inputting input signals to the input ports P11 to P18, and the output blocks 8A and 8B connected to the output ports P21 to P28 of control block 6 and including the semiconductor relays CH1 to CH4 turning on/off according to the output signal.

According to the embodiment described above, while the input blocks 10A and 10B are constituted by the local switches SW, it is not limited to this. The input block 10A, 10B may be the one which can input the input signal to the control block 8 and 9, for example, it can be constituted by sensor or the like.

Further, according to the above-described embodiment, the slave device 3 and the master device 2 are configured combining the control block 6, the input blocks 7A, 7B and the output blocks 8A and 8B, but it is not limited to this. The block may further include a power source block supplying power, and a communication block with a communication interface. Thus, it is possible to use what includes no power supply function and no communication function as the control block 6.

Further, according to the above-described embodiment, while the writing device 14 transmits the ID of the slave devices 301 to 30n, it is not limited to this. The master device 2 may sequentially transmit the IDs of the slave devices 301 to 30n.

The present invention is not limited to the above embodiment. That is, various modifications can be made within the scope of the present invention without deviating from the gist of the present invention.

REFERENCE SINGS LIST

1 in-vehicle network (communication system)
2 master device
3 slave device
4 vehicle
5 load
6 control block (circuit block)
7A, 7B input block (circuit block)
8A, 8B output block (circuit block)
14 Writing device
84A CPU (first setting unit, switch control unit, second setting unit)
301 to 303 slave device
CH1 to CH4 semiconductor relay (output switch)
P11 to P18 input port
P21 to P28 output port

What is claimed is:

1. A communication system comprising:
a plurality of slave devices each comprising ones of slave device ID storages;
a master device communicating with the plurality of slave devices and comprising a master device ID storage;
a writing device for writing slave device IDs into the slave devices and a master device ID into the master device;
wherein the writing device transmits the master device ID to the master device, and then sequentially transmits the slave device IDs of the plurality of slave devices to the master device,
wherein the master device is provided for each of the plurality of slave devices,
wherein the master device includes a plurality of output switches for supplying power to the corresponding ones of the slave devices, a first setting unit for receiving the master device ID from the writing device and setting the master device ID to the master device ID storage of the master device, and a switch control unit, after setting of the master device ID to the master device ID storage, sequentially switching on ones of the output switches and receiving corresponding ones of the slave device IDs of the plurality of slave devices from the writing device, and
wherein each of the plurality of slave devices includes a second setting unit setting the ones of the slave device IDs, received from the writing device after a power is supplied, to respective ones of the slave device ID storages.

2. The communication system according to claim 1,
wherein the master device is installed in a vehicle, and the plurality of slave devices is connected to a plurality of loads, and
wherein a same type load is connected to one slave device, provided that the plurality of loads is classified into a load that can be driven at all times, a load that can be driven during power-on of accessory, and a load that can be driven during ignition.

3. The communication system according to claim 1, further comprising:
a plurality of master devices, including the master device, installed in a vehicle,
wherein the master device ID of the master device includes installation information indicating an installation position of the master device in the vehicle.

4. The communication system according to claim 2, further comprising:
a plurality of master devices, including the master device, installed in a vehicle,
wherein the master device ID of the master device includes installation information indicating an installation position of the master device in the vehicle.

5. The communication system according to claim 1, further comprising:
a plurality of types of circuit blocks, each with different functions and being formed on separate substrates,
wherein the slave devices and the master device are configured as combinations of the plurality of types of circuit blocks.

6. The communication system according to claim 2, further comprising:
a plurality of types of circuit blocks, each with different functions and being formed on separate substrates,
wherein the slave devices and the master device are configured as combinations of the plurality of types of circuit blocks.

7. The communication system according to claim 3, further comprising:
a plurality of types of circuit blocks, each with different functions and being formed on separate substrates, wherein the slave devices and the master device are configured as combinations of the plurality of types of circuit blocks.

8. The communication system according to claim 4, further comprising:
a plurality of types of circuit blocks, each with different functions and being formed on separate substrates,
wherein the slave devices and the master device are configured as combinations of the plurality of types of circuit blocks.

9. The communication system according to claim 5, wherein
at least one of the circuit blocks includes a control block for controlling the slave device or the master device, an input block connected to an input port of the control block for inputting an input signal to the input port, and an output block connected to an output port of the control block, and including an output switch turning on and off responding to an output signal.

10. The communication system according to claim 6, wherein
at least one of the circuit blocks includes a control block for controlling the slave device or the master device, an input block connected to an input port of the control block for inputting an input signal to the input port, and an output block connected to an output port of the control block, and including an output switch turning on and off responding to an output signal.

11. The communication system according to claim 7, wherein
at least one of the circuit blocks includes a control block for controlling the slave device or the master device, an input block connected to an input port of the control block for inputting an input signal to the input port, and an output block connected to an output port of the control block, and including an output switch turning on and off responding to an output signal.

12. The communication system according to claim 8, wherein
at least one of the circuit blocks includes a control block for controlling the slave device or the master device, an input block connected to an input port of the control block for inputting an input signal to the input port, and an output block connected to an output port of the control block, and including an output switch turning on and off responding to an output signal.

13. The communication system according to claim 1,
wherein the writing device, the master device, and the slave devices are arranged separately from each other in a vehicle,
wherein the writing device is configured to determine whether a previous master ID stored in the master device ID storage matches the master device ID and whether previous slave device IDs match the slave device IDs.

* * * * *